United States Patent

Yuuki et al.

[11] Patent Number: 6,147,725
[45] Date of Patent: Nov. 14, 2000

[54] LIQUID CRYSTAL PANEL MODULE WITH POLARIZATION TRANSFORMATION FOR INCREASED BRIGHTNESS

[75] Inventors: Akimasa Yuuki; Tomohiro Sasagawa, both of Tokyo, Japan

[73] Assignee: Mitsubishi Denki Kabushiki Kaisha, Tokyo, Japan

[21] Appl. No.: 09/175,542

[22] Filed: Oct. 20, 1998

[30] Foreign Application Priority Data

Nov. 21, 1997 [JP] Japan ................................ 9-321616

[51] Int. Cl.[7] ................ G02F 1/335; G02B 6/10
[52] U.S. Cl. ................ 349/65; 349/61; 349/62; 349/96; 385/146; 362/32
[58] Field of Search ................ 349/61, 62, 65, 349/96; 385/146; 362/32

[56] References Cited

U.S. PATENT DOCUMENTS

| | | | |
|---|---|---|---|
| 5,485,354 | 1/1996 | Ciupke et al. | 349/62 |
| 5,555,109 | 9/1996 | Zimmerman et al. | 349/62 |
| 5,587,816 | 12/1996 | Gunjima et al. | 349/62 |
| 5,600,462 | 2/1997 | Suzuki et al. | 349/112 |
| 5,627,926 | 5/1997 | Nakamura et al. | 349/62 |
| 5,635,278 | 6/1997 | Williams | 428/172 |
| 5,712,694 | 1/1998 | Taira et al. | 349/9 |
| 5,838,404 | 11/1998 | Ozeki et al. | 349/62 |
| 5,887,964 | 3/1999 | Higuchi et al. | 362/31 |
| 5,914,760 | 6/1999 | Daiku | 349/62 |
| 5,926,601 | 7/1999 | Tai et al. | 385/146 |

FOREIGN PATENT DOCUMENTS

| | | |
|---|---|---|
| 421628 | 4/1991 | European Pat. Off. . |
| 0597261 | 5/1994 | European Pat. Off. . |
| 0632229 | 1/1995 | European Pat. Off. . |
| 659024 | 6/1995 | European Pat. Off. . |
| 0730187 | 9/1996 | European Pat. Off. . |
| 5224019 | 9/1993 | Japan . |
| 6-160840 | 6/1994 | Japan . |
| 7120752 | 5/1995 | Japan . |
| 8136733 | 5/1996 | Japan . |
| 2272277 | 5/1994 | United Kingdom . |

*Primary Examiner*—James A. Dudek
*Assistant Examiner*—Tarifur R. Chowdhury
*Attorney, Agent, or Firm*—Leydig, Voit & Mayer, Ltd.

[57] ABSTRACT

A liquid crystal panel module includes a backlight unit consisting of a light guide plate having a reflecting sheet at a lower face, a lamp for projecting light to one side of the light guide plate, a reflector for condensing the light from the lamp onto the light guide plate, and a liquid crystal panel having a polarizing plate at a lower face and disposed on the backlight unit. Equilateral prisms are located between the light guide plate and reflecting sheet of the backlight unit in a direction parallel to a polarization axis of the polarizing plate of the liquid crystal panel unit. Each of the prisms has a prism angle so that the angle of incidence of the light guided from the lamp into the light guide plate is the Brewster angle of the prisms.

7 Claims, 10 Drawing Sheets

LIQUID CRYSTAL PANEL MODULE WITH POLARIZATION TRANSFORMATION FOR INCREASED BRIGHTNESS

BACKGROUND OF THE INVENTION

1. Field of the Invention

The present invention relates to a liquid crystal panel display device used in a notebook personal computer or the like.

2. Description of the Prior Art

It is well known that notebook personal computers (referred to simply as "notebook computers" hereinafter) and laptop wordprocessors use nearly rectangular liquid crystal display devices as lids. A liquid crystal panel module is incorporated inside the liquid crystal display device, which consists of a light transmission liquid crystal panel unit and a backlight unit illuminating the liquid crystal panel unit from the rear. The backlight unit is constituted mainly of a light guide plate for guiding illumination light to the liquid crystal panel unit and a lamp arranged at one side of the light guide plate.

Brightness of a liquid crystal display at the liquid crystal panel display device constituted as above is adjusted through the amount of the illumination light at the backlight unit. Electrical power supplied to the lamp in the backlight unit is increased if the brightness of a screen of the liquid crystal display is to be increased.

A TFT color liquid crystal panel used in a color liquid crystal display device nowadays has a light transmittance of as low as approximately 6–10%. The transmittance is determined almost by a multiplication of an aperture ratio (50–80%) of a TFT array substrate, transmittance (30%) of a color filter and transmittance of a polarizing plate set at a bottom surface of the liquid crystal display panel. The transmittance of the polarizing plate of the conventional device is low, specifically, approximately 40%. As such, a relatively large luminance is required for the lamp to illuminate the whole face of the TFT color liquid crystal display panel brightly, which necessitates a large power to be fed to the lamp.

For instance, while the 12.1-inch TFT color liquid crystal panel used in a notebook computer requires nearly 2W power for the backlight unit, this power is about ⅓ of the total power fed to the notebook computer.

In the case where the notebook computer is driven by a battery, it is preferable that the consumption of power in the backlight unit be small, and for reducing the power consumed in the backlight unit, it is necessary to increase the transmittance of the liquid crystal panel.

The liquid crystal panel module employed in the conventional liquid crystal panel display device will be described hereinbelow.

Figure 12:
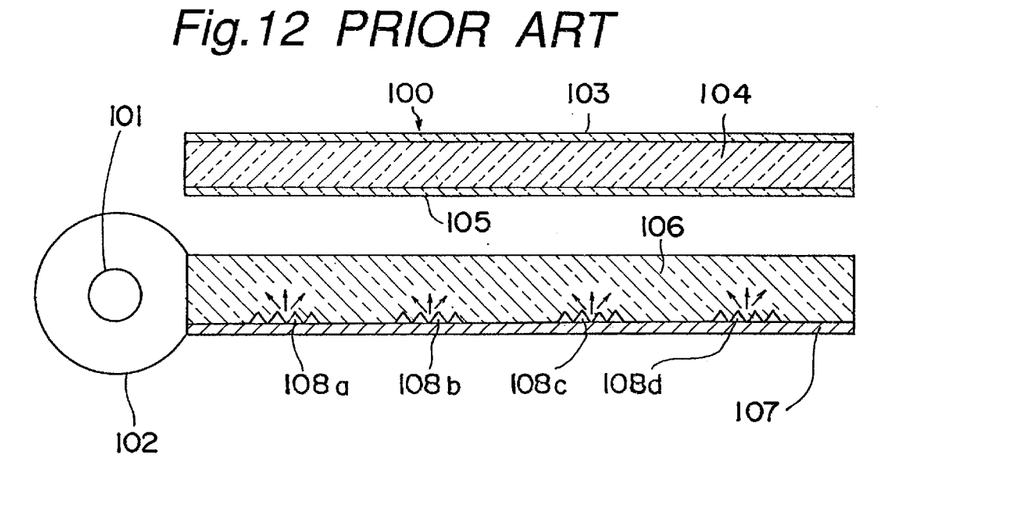
FIG. 12 is a sectional view of the constitution of a conventional liquid crystal panel module.

FIG. 12 is a sectional view of a nearly rectangular liquid crystal panel module 100 used in a liquid crystal panel display device in the prior art. The liquid crystal panel module 100 consists of a backlight unit of nearly the same shape, i.e., nearly rectangular, including a lamp 101, a reflector 102 and a light guide plate 106, and a liquid crystal panel unit of almost the same shape, namely, nearly rectangular having polarizing plates 103, 105 attached to front and rear faces of a liquid crystal panel 104. A reflecting sheet 107 is attached to a bottom surface of the light guide plate 106. A plurality of sawtoothed diffused reflection parts 108a–108d are provided on the reflecting sheet 107 to diffuse and reflect the light of the lamp 101.

The polarizing plate 105 attached to the rear face of the liquid crystal panel 104 passes only light of a predetermined polarization direction, and absorbs light in other polarization directions. The polarizing plate 103 attached to the front face of the liquid crystal panel 104 passes only light in a direction parallel to or perpendicular to a polarization axis of the polarizing plate 105, absorbing light of the other polarization directions.

In the above-described constitution, circularly polarized light, including horizontal oscillation waves (p polarized light) and perpendicular oscillation waves (s polarized light) with respect to the bottom face of the light guide plate 106 are brought into the light guide plate 106 of the liquid crystal panel module 100. No less than half of the lamp light is absorbed at the polarizing plate 105. Since the light is absorbed also within the light guide plate 106, the transmittance of light is decreased to as low as about 40% as discussed above.

Figure 13:
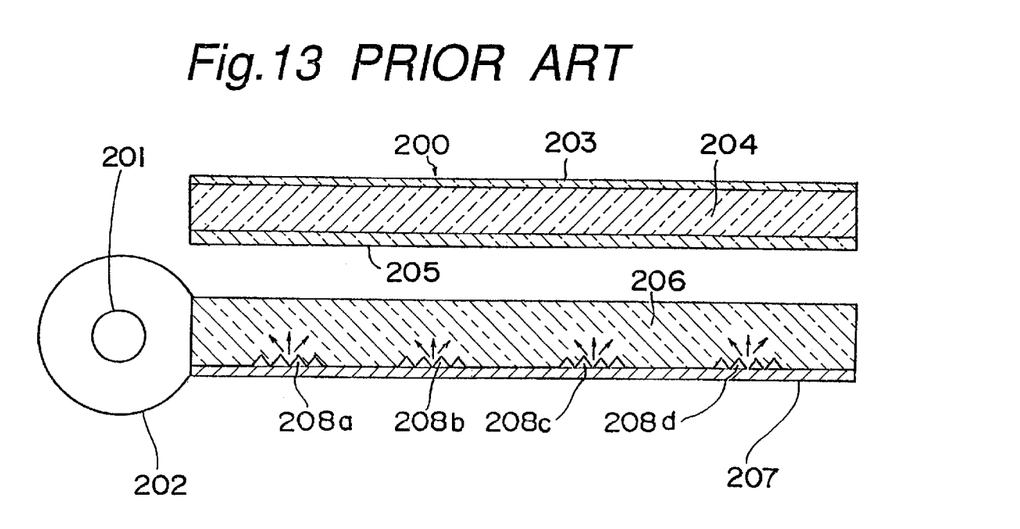
FIG. 13 is a sectional view of the constitution of a conventional liquid crystal panel module.

FIG. 13 is a diagram showing the constitution of a liquid crystal panel module 200 proposed to solve the aforementioned problem. The liquid crystal panel module 200 comprises a backlight unit of a lamp 201, a reflector 202 a light guide plate 206 and, a liquid crystal panel unit of a TFT color liquid crystal panel 204 held by a polarizing plate 203 and a polarizing separating film 205. The polarizing separating film 205 is a polarizing film of a reflecting type, for example, DBEF by Sumitomo 3M Co., Ltd. (registered trade name by Sumitomo 3M), passing light in a predetermined polarization direction and reflecting light in the other polarization directions. The polarizing plate 203 allows only light in a polarization direction parallel or perpendicular to a polarization axis of the polarizing separating film 205, whole absorbing light in the other polarization directions. Similarly to the liquid crystal panel module 100, a reflecting sheet 207 is attached to a bottom surface of the light guide plate 206, with a plurality of sawtoothed diffused reflection parts 208a–208d to diffuse and reflect the light from the lamp 201.

In the thus-constituted liquid crystal panel module 200, the light that cannot pass through the polarizing separating film 205 is reflected totally to the light guide plate 206. The light reflected towards the light guide plate 206 is changed to be irregular in polarization direction at the diffused reflection part 208 at the lower surface of the light guide plate 206, and then sent to the polarizing separating film 205 again. The polarizing separating film 205 passes, among the light input thereto, light in a predetermined polarization direction generated when the light is changed in the polarization direction at the diffused reflection part 208, and reflects light in the other polarization directions. This reflection of light is repeatedly carried out in the light guide plate 206, whereby the amount of light passing the polarizing separating film 205 is increased, thereby decreasing loss of the lamp light.

However, the polarizing separating film 205 is complicated in structure and expensive as compared with general polarizing films, hence inviting a cost rise of the liquid crystal panel module 200.

SUMMARY OF THE INVENTION

The present invention has for its object to provide a liquid crystal panel module equipped with a backlight unit of a structure whereby a TFT liquid crystal panel can be illuminated inexpensively and efficiently.

In order to accomplish the above object of the present invention, a liquid crystal panel module is provided which comprises a backlight unit consisting of a light guide plate having a reflecting sheet at a lower face thereof, a lamp for projecting light from one side of the light guide plate and a reflector for condensing the light of the lamp to the light guide plate, and a liquid crystal panel unit having a polarizing plate at a lower face thereof and disposed on the backlight unit. A plurality of equilateral prisms are arranged between the light guide plate and the reflecting sheet constituting the backlight unit in a direction to be parallel to a polarization axis of the polarizing plate of the liquid crystal panel unit. The equilateral prism has a prism angle whereby an angle of incidence of the light guided from the lamp into the light guide plate becomes a Brewster angle.

The amount of light to be absorbed at the polarizing plate at a bottom face of the liquid crystal panel unit is reduced greatly. Particularly, the liquid crystal panel module employs the equilateral prisms exerting the above-described prism angle in the light guide plate, and therefore, the light including an s-polarized light much can be directly sent to the liquid crystal panel unit while the absorption of light at the polarizing plate at the bottom face of the liquid crystal panel unit is suppressed. The liquid crystal panel unit is accordingly efficiently illuminated. Moreover, the liquid crystal panel module is constructed inexpensively, because an expensive reflecting-type polarizing film as in the conventional liquid crystal panel module is not employed.

According to a preferred embodiment of the present invention, a polarization rotating film is set on a face of the reflecting sheet at the side of the light guide plate which rotates a polarization direction of the entering light by a predetermined angle, and preferably, the equilateral prism has a larger index of refraction than that of the interior of the light guide plate. Owing to this, the light including much more s-polarized light is reflected to the liquid crystal panel unit. That is, the equilateral prisms having the larger index of refraction than the interior of the light guide plate and also the polarization rotating film provided between the bottom face of the light guide plate and the reflecting sheet effectively work to improve a reflectance of the s waves directly reflected to the liquid crystal panel unit.

When a space part is provided in the light guide plate where the light guided from the lamp directly enters prism faces, the light guide plate is made hollow, so that the liquid crystal panel module becomes light-weight and reduced in cost.

According to a different preferred embodiment of the present invention, the liquid crystal panel module comprises a backlight unit consisting of a light guide plate having a reflecting sheet at a lower face thereof, a lamp for projecting an illumination light from one side of the light guide plate and a reflector for condensing the light from the lamp to the light guide plate, and a liquid crystal panel unit having a polarizing plate at a lower face thereof and disposed on the backlight unit, which further includes a reflecting-type polarizing film at a side face of one side of the light guide plate where the lamp is set so as to pass light of the same polarization direction as the polarizing plate, and a plurality of reflecting members at a bottom face of the light guide plate to directly reflect the light guided from the lamp into the light guide plate to the liquid crystal panel unit. In the constitution with using the reflecting-type polarizing film at the side face of the light guide plate to which the light from the lamp is projected, as compared with the case where the reflecting-type polarizing film is set between the light guide plate and the liquid crystal panel unit, the backlight unit becomes lower in cost.

BRIEF DESCRIPTION OF THE DRAWINGS

The present invention will become readily understood from the following description of preferred embodiments thereof made with reference to the accompanying drawings throughout which like parts are designated by like reference numerals and in which.

DETAILED DESCRIPTION OF THE PREFERRED EMBODIMENTS (1) Embodiment 1

Figure 1:
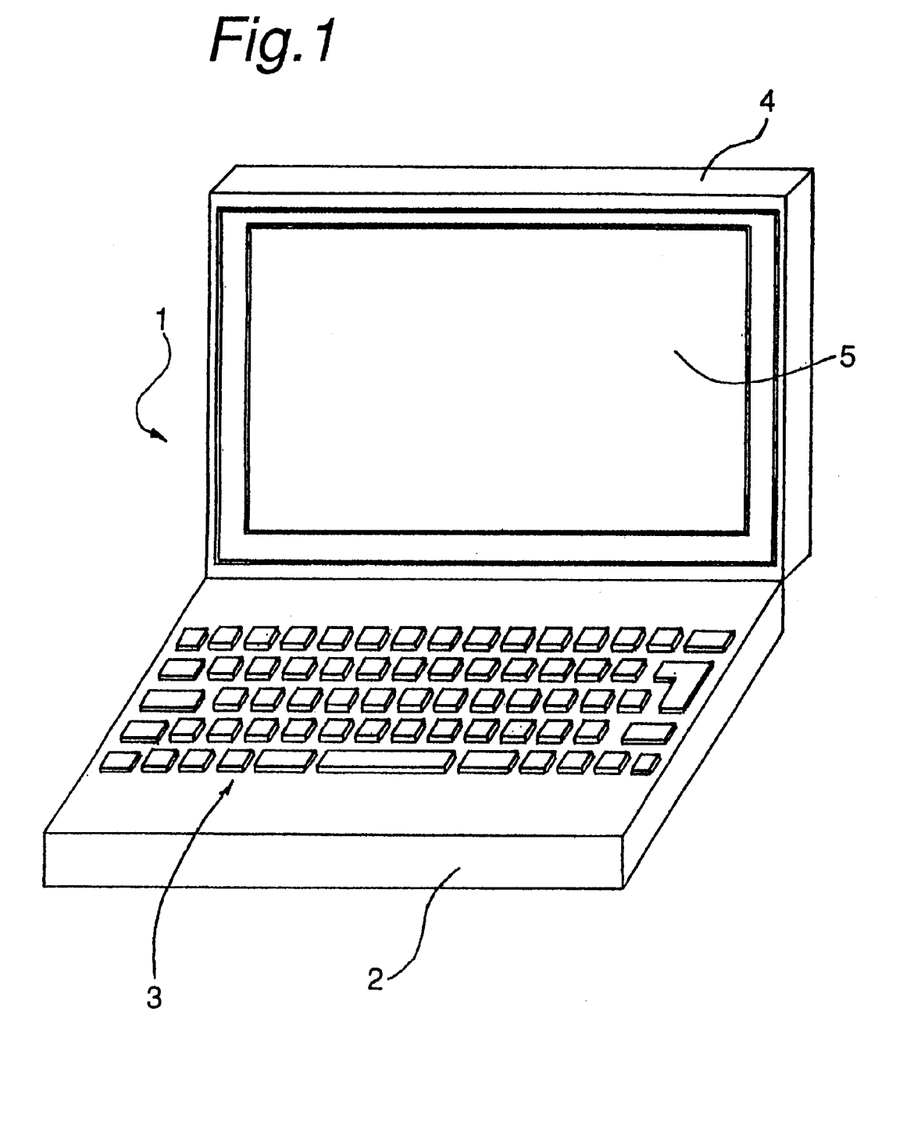
FIG. 1 is a perspective view of a notebook personal computer adopting a liquid crystal display device according to an embodiment 1 of the present invention.

According to a liquid crystal display device of an embodiment 1 of the present invention, a plurality of reflecting members (equilateral prisms) are provided within a light guide plate to reflect directly to a liquid crystal panel light, among illumination light from a lamp, which includes oscillation waves having an electric field oscillating in a direction perpendicular to a bottom surface of the light guide plate, that is, s polarized light. FIG. 1 is a perspective view of a notebook personal computer 1 employing a liquid crystal display device 4 of the embodiment 1. The notebook personal computer 1 is constituted of a main body 2 having a keyboard 3 at an upper face and a CPU, a hard disk, etc. inside, and the liquid crystal display device 4 incorporating a liquid crystal panel module 5. The liquid crystal display device 4 is connected in a state to be openable/closable to the main body 2.

Figure 2:
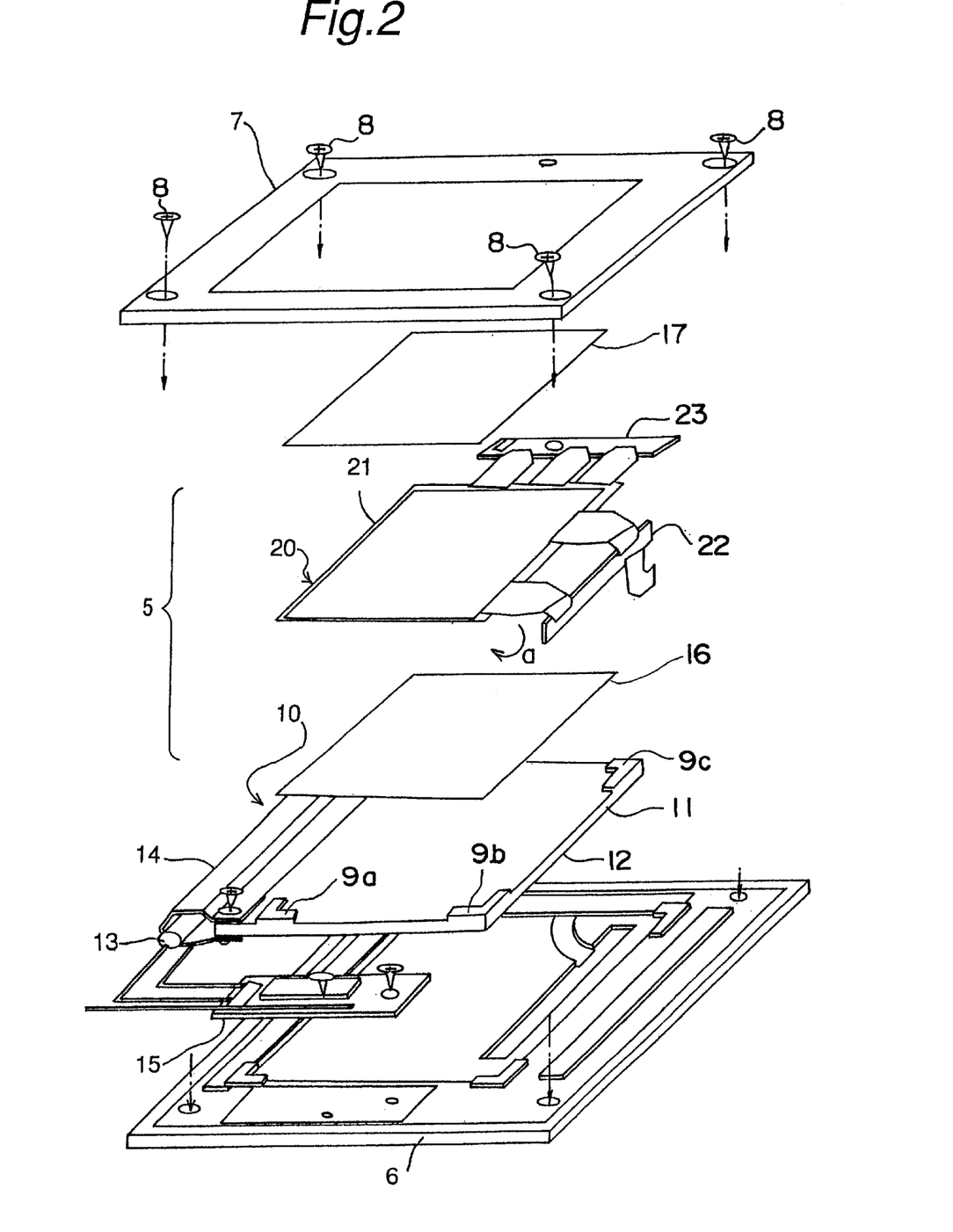
FIG. 2 is an exploded perspective view of the liquid crystal display device.

FIG. 2 is an exploded perspective view showing the structure of the liquid crystal display device 4 of FIG. 1. The liquid crystal panel module 5 is arranged at the side of an inner face of a metallic case 6 of the liquid crystal display device 4, over which a mask frame 7 is fitted. The metallic case 6, liquid crystal panel module 5 and mask frame 7 are clamped and united in one body by a plurality of screws 8 fastened from an outer face of the mask frame 7. The liquid crystal panel module 5 is comprised of a backlight unit 10 and a liquid crystal panel unit 20, layered one upon another. The case 6 is formed of, e.g., Mg or Mg light alloy, by die casting.

The backlight unit 10 has a light guide plate 11 for guiding illumination light to the liquid crystal panel unit 20 and a fluorescent lamp 13 disposed at one side of the light guide plate 11. A reflecting sheet 12 of, for example, a resin film coated with Ag is attached at the side of a rear face of the light guide plate 11. The constitution inside the light guide plate 11 will be detailed later. The lamp 13 is connected to a piezoelectric trans inverter 15 working as a high frequency power source. The lamp 13 has a polygonal cross section and is surrounded by a reflector 14 which is opened only at the single side facing the light guide plate 11. An inner face of the reflector 14 is, for instance, a silver-plated thin brass sheet.

L-shaped ribs 9a, 9b, 9c, 9d are provided at four corners of an upper face of the light guide plate 11, although 9d is not illustrated in the drawing. A polarizing plate 16, a TN liquid crystal panel 21 and a polarizing plate 17 constituting the liquid crystal panel unit 20 are layered sequentially on the light guide plate 11 with the L-shaped ribs 9a–9d and held at a predetermined position.

The liquid crystal panel unit 20 comprises the TFT liquid crystal panel 21 as a transmission-type liquid crystal panel held between the polarizing plates 16 and 17, a source printed circuit substrate 22 and a gate printed circuit substrate 23. The polarizing plate 16 transmits light of a predetermined polarization direction and absorbs light with other polarization directions. The polarizing plate 17 has a polarization axis in a direction perpendicular to the polarization axis of polarization plate 16. The source printed circuit substrate 22 is bent to turn to the rear side of the light guide plate 11, as indicated by an arrow a, after the liquid crystal panel unit 20 is fixed on the light guide plate 11. The source printed circuit substrate 22 is fixed to the case 6 in the above state. The case 6 has a recessed part which can receive the bent source printed circuit substrate 22, so that a face abutting the light guide plate 11 is flat.

Figure 3:
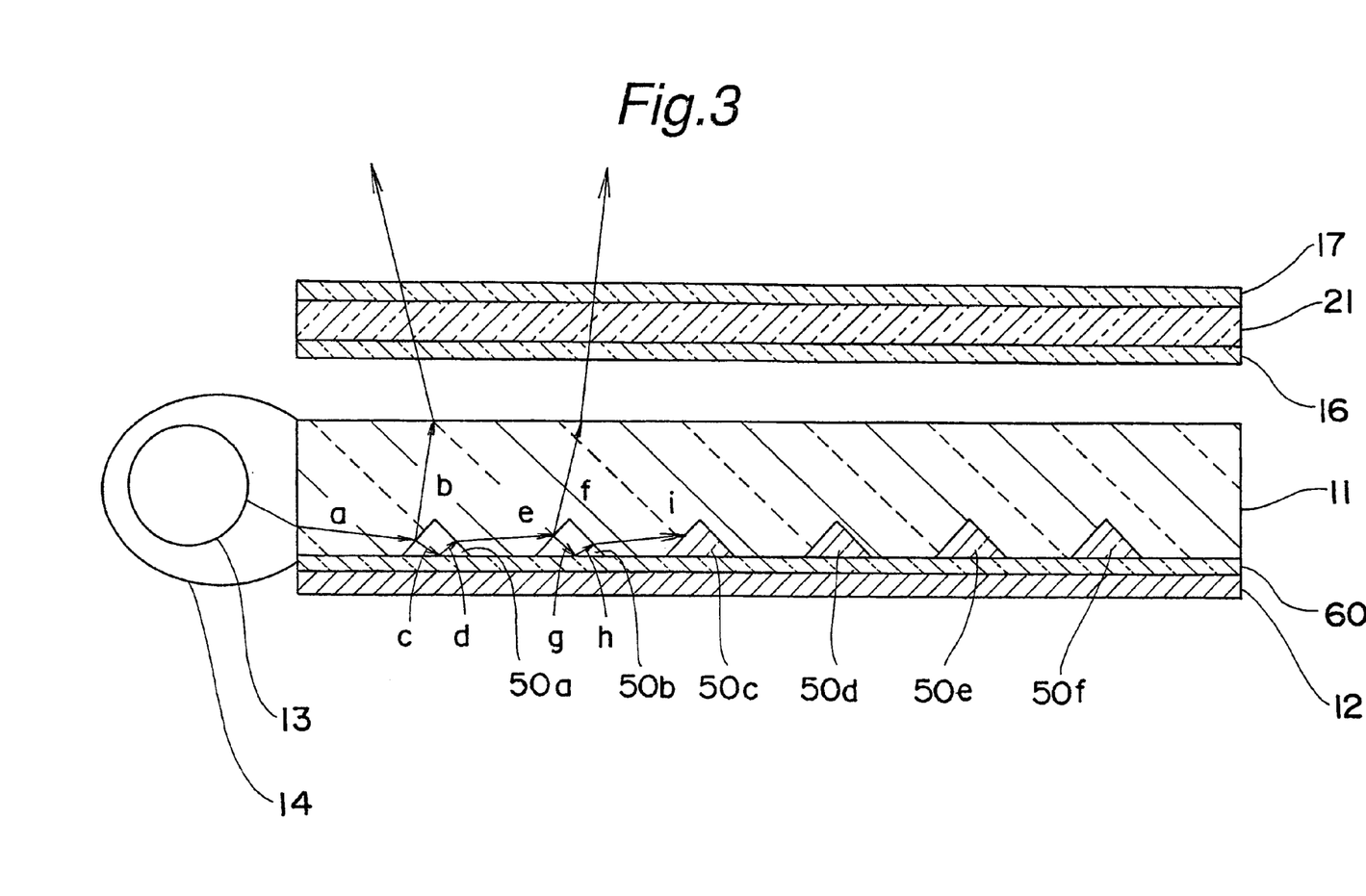
FIG. 3 is a sectional view showing the constitution of a liquid crystal panel module.

FIG. 3 is a sectional view of the constitution of the liquid crystal panel module 5. As depicted earlier, the liquid crystal panel module 5 is obtained by setting the liquid crystal panel unit 20 of the TFT liquid crystal panel 21 held by the polarizing plates 16 and 17 onto the backlight unit 10 having the lamp 13, reflector 14 and light guide plate 11. The polarizing plate 16 on a bottom face of the liquid crystal panel 21 has a polarization axis in a perpendicular to an axis direction of the lamp when seen from above the liquid crystal panel 21.

A polarization rotating film 60 and the reflecting sheet 12 are attached to a bottom face of the light guide plate 16. The polarization rotating film 60 rotates the polarization direction of the entering light by 90°. Although described later in more detail, there are arranged at a bottom part of the light guide plate 11 a plurality of reflecting members 50a–50f of equilateral prisms having a prism angle whereby the primary light from the lamp 13 enters with a Brewster angle (referring also to FIG. 4). These reflecting members 50a–50f are formed of a material of a higher index of refraction than a material of the light guide plate 11.

In the event, for example, the light guide plate 11 is formed having acrylic resin of an index of refraction n1=1.49, tantalum oxide $Ta_2O_5$ of an index of refraction n2=2.25 is used for the reflecting member 50. The ratio of the indices of refraction n2/n1 becomes 1.51 in the above case. The ratio is preferred to be large, the reason for which will be discussed hereinbelow.

Figure 4:
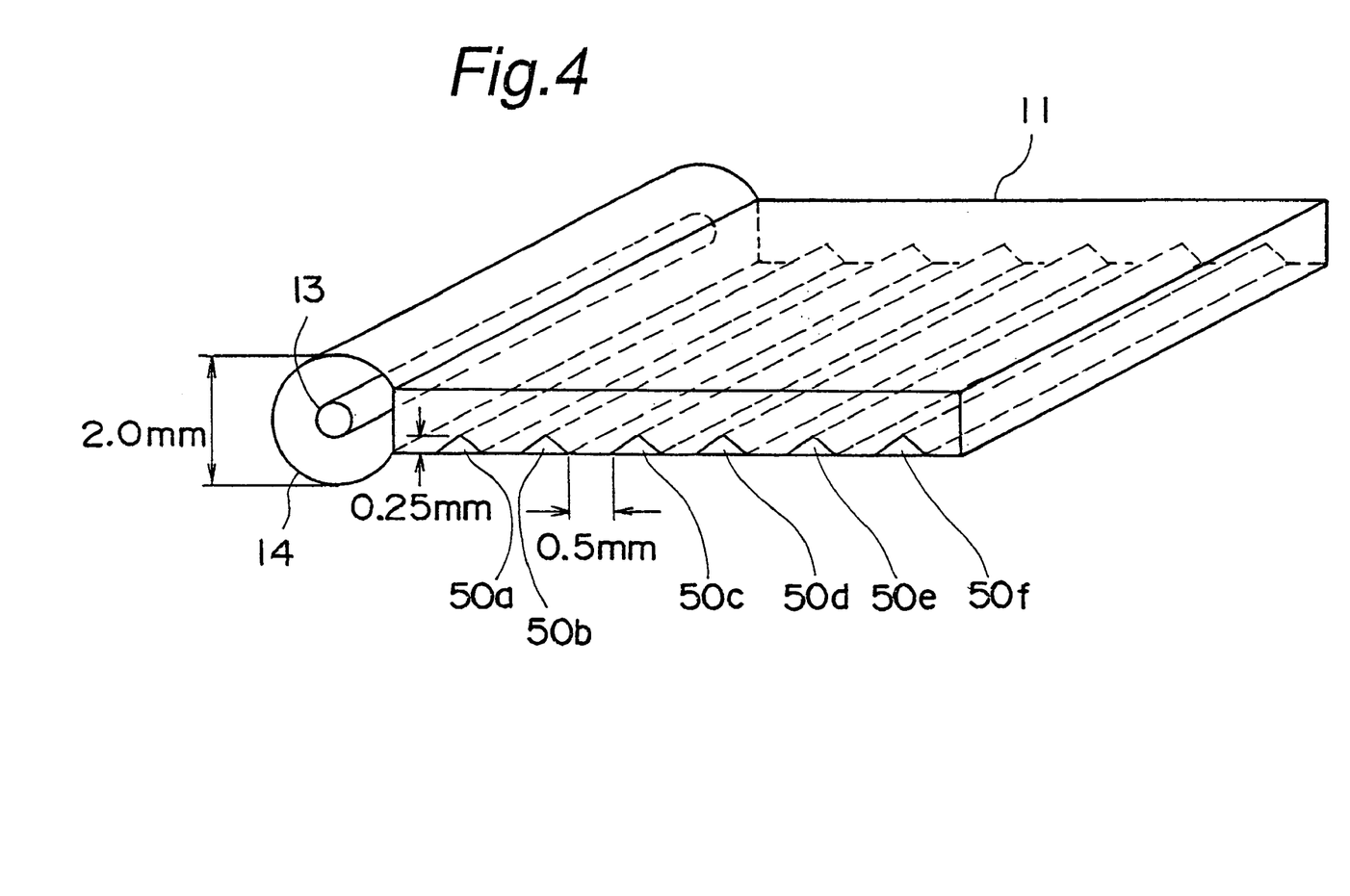
FIG. 4 is a perspective view showing an arrangement of a reflecting member.

FIG. 4 is a perspective view showing a state of the reflecting members 50a–50f in the light guide plate 11. As described before, the polarizing plate 16 shown in FIGS. 2 and 3 has a polarization axis perpendicular to the axis of the lamp. On the other hand, the reflecting members 50a–50f are arranged to be perpendicular to the polarization axis of the polarizing plate 16, in other words, parallel to the axis of the lamp. Each of the reflecting members 50a–50f is a transparent body having a uniform index of refraction n, more specifically, a prism having an isosceles triangular cross section of 0.25 mm height, 120° vertex angle and 30° base angles. The reflecting members 50a–50f are spaced by 0.5 mm. Generally, an angle defined by utilized two faces (prism faces), i.e., the aforementioned vertical angle is named the prism angle and a prism of the isosceles triangular cross section is a equilateral prism.

Figure 5:
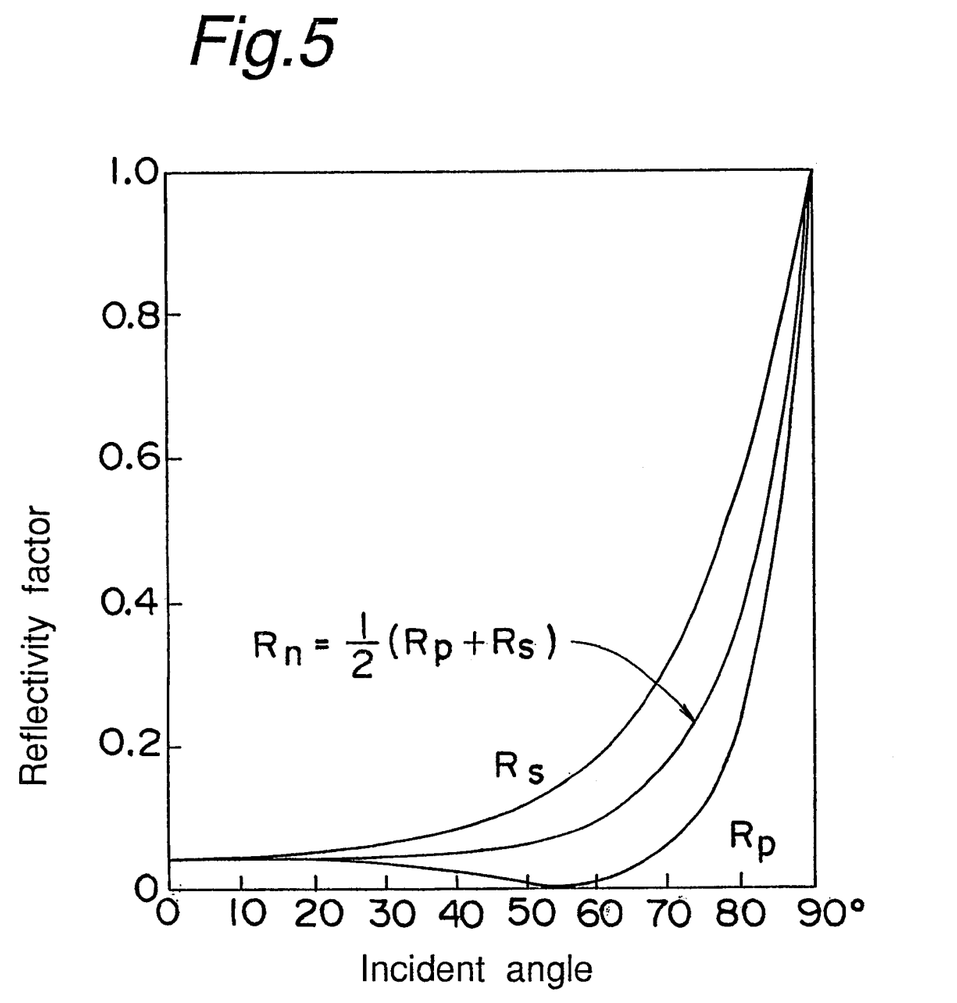
FIG. 5 is a graph of a relationship of an incident angle of light to a reflecting surface of the reflecting member and reflectance.

FIG. 5 is a graph of the relationship of the angle of incidence of light on a reflecting face of each reflecting member 50a–50f and a reflectance. Three curves in the graph represent respectively a reflectance Rs of oscillation waves (s polarized light) having an electric field oscillating in a direction perpendicular to a plane of incidence, a reflectance Rp of oscillation waves (p polarized light) having an electric field oscillating in a direction parallel to the plane of incidence, and a reflectance Rn=(Rp+Rs)/2 of natural light.

For example, when the light enters the reflecting face of the reflecting member 50a–50f with an incident angle of 55°, the reflectance Rs of the light polarized in the perpendicular direction to the reflecting face is 0.2 and the reflectance Rp of the light polarized in the parallel to the reflecting face is 0. Therefore, the reflected light at this time becomes linearly polarized light polarized in a direction perpendicular to the reflecting face. The angle of incidence, 55° in the example, whereby a ratio of reflectances of the p and s polarized lights is maximum is gene ally called the Brewster angle.

In order to improve the transmittance of light at the polarizing plate 16, it is preferred that the reflected light from the reflecting members 50a–50f include many polarization components agreeing with a polarization direction of the polarizing plate 16. The ratio of reflectances of the p polarized light and s polarized light at the Brewster angle is increased as the ratio n2/n1 of the index of refraction n1 inside the light guide plate 11 and the index of refraction n2 of the reflecting members 50a–50f becomes larger.

Therefore, a material having an index of refraction n2 as large as possible, relative to the index of refraction n1 of the light guide plate, is preferable for the reflecting members 50a–50f. Although $Ta_2O_5$ is used for the reflecting members 50a–50f in the embodiment, materials having a high permittivity, shown in Table 1 below, that have a larger index of refraction than that of the light guide plate 11 and a high transmittance are also utilizable for the reflecting members 50a–50f.

TABLE 1

| Material | Index of refraction | Transmission wavelength band ($\mu$m) |
| --- | --- | --- |
| $Sr_{0.5}Ba_{0.5}Nb_2O_6$ | 2.27 | 0.4–6 |
| $TiO_2$ | 2.58 | 0.4–5 |
| $SrTiO_3$ | 2.38 | 0.4–5 |
| Diamond | 2.42 | 0.2–5 |
| $Ta_2O_5$ | 2.25 | 0.35–10 |
| $ZrO_2$ | 2.10 | 0.34–12 |
| ZnS | 2.30 | 0.4–14 |
| Acrylic resin | 1.49 | 0.3–10 |

The incident angle of light passing through the light guide plate 11 is distributed in a range of 0–45° to a direction parallel to the light guide plate 11, approximately 20° on the average. The reflecting member 50a–50f used in the liquid crystal panel module 5 is the equilateral prism having a prism angle 150° and accordingly the base angle of the equilateral prism is 15°. The angle of incidence of light is thus from 30 to approximately 75°. From the graph of FIG. 5, most of the reflected light is the linearly s polarized light in a direction perpendicular when the angle of incidence is 30–75°.

Since the equilateral prism with the prism angle 150° is employed as the reflecting member 50I–50f of the liquid crystal panel module 5, the light is less absorbed at the polarizing plate 16, in other words, the transmittance at the polarizing plate is improved.

Referring back to FIG. 3, how the light projected from the lamp 13 (indicated by the arrow a) enters the reflecting member 50a will be discussed in detail. The light projected from the lamp 13 is natural light. Supposing that the amount of the natural light is 1, the light is composed of 0.5 oscillation waves (p polarized light) with an oscillation direction of the electric field parallel to the plane of incidence to the reflecting member 50a and 0.5 oscillation waves (s polarized light) having an electric field oscillating in a direction perpendicular to the plane of incidence. If the incident angle of light on the reflecting member 50a is 55°, reflected light (shown by an arrow b) comprises 0 p polarized light and 0.1 s polarized light. The polarizing plate 16 passes only the linearly polarized light in the direction perpendicular to the reflecting face of the reflecting member 50a, while absorbing the light of the other polarization directions. In this case, however, the whole of the reflected light is allowed to pass through the polarizing plate 16.

Meanwhile, supposing that the light is never absorbed at the reflecting member 50a, refracted light (shown by an arrow c) is constituted of 0.5 p polarized light and 0.4 s polarized light. The refracted light is, after passing the polarization rotating film 60, reflected at the reflecting sheet 12 and again passes through the polarization rotating film 60. Light reflected (of an arrow d) from the reflecting sheet 12 is rotated by 90° by the polarization rotating film 60 to be comprised of 0.4 p polarized light and 0.5 s polarized light. Light projected (of an arrow e) from the reflecting member 50a can always be an elliptically polarized light including a lot of s polarized light owing to the polarization rotating film 60.

As is understood from the above description, since the light guide plate 11 is provided with reflecting members 50a–50f, the light that includes less p polarized light and much s polarized light can be fed to the light polarizing plate 16. As a result, the amount of light absorbed at the polarizing plate 16 (p polarized light) is reduced and the transmittance of light at the polarizing plate 16 is improved. When the transmittance at the polarizing plate 16 is improved, the liquid crystal panel can be illuminated with a required brightness even if the amount of power supplied to the lamp 13 is small. For example, the drive time of a battery driving the notebook personal computer employing the liquid crystal panel module for the display can be extended.

Figure 6:
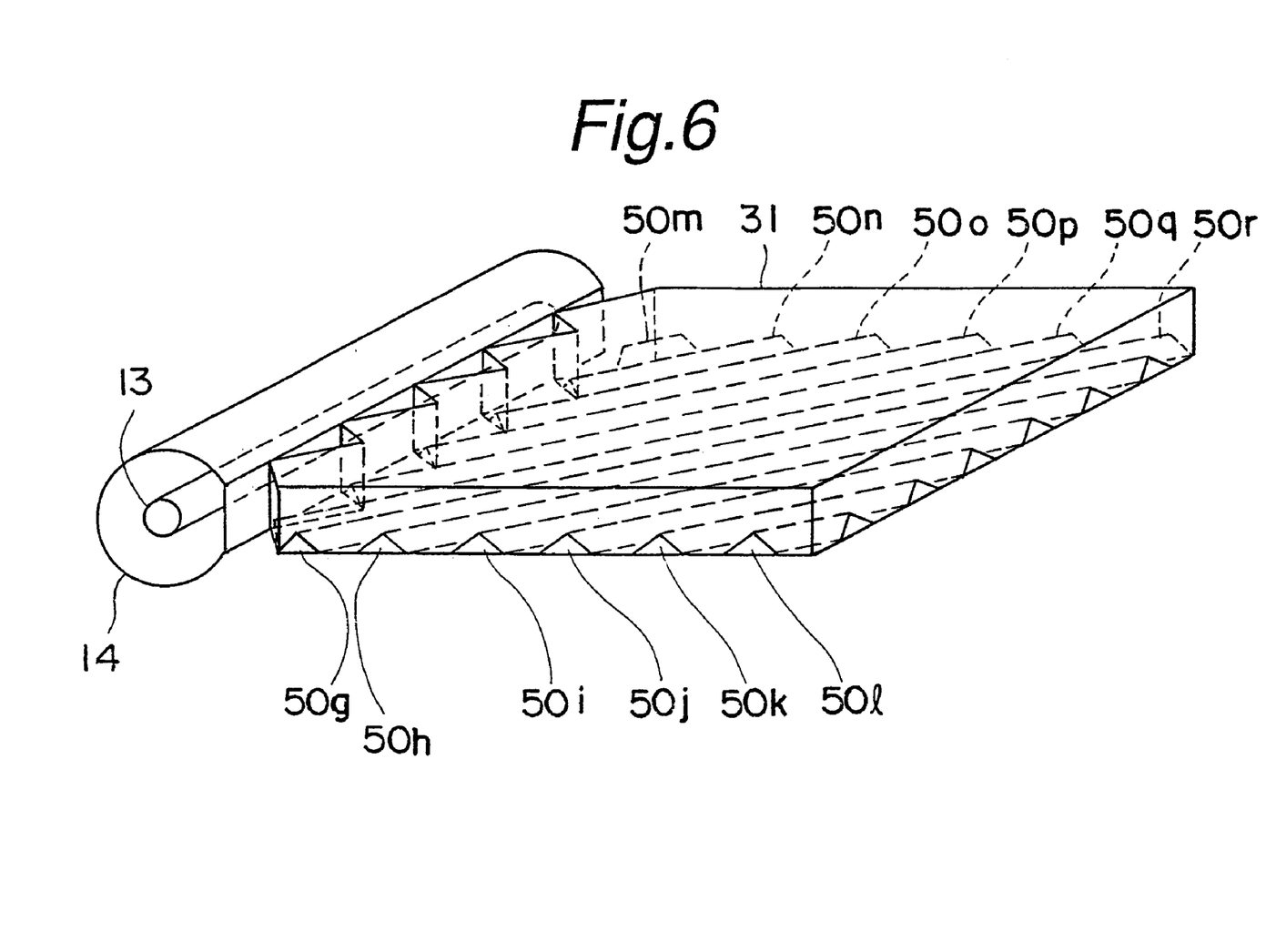
FIG. 6 is a diagram of a modified example of the arrangement of the reflecting member.

FIG. 6 indicates an arrangement of a light guide plate 31 and reflecting members 50g–50r in the case where a polarizing plate 30 has a polarization axis inclined by 45° to the axis direction of the lamp is used in place of the polarizing plate 16. The reflecting m embers 50g–50r are arranged side by side in a direction perpendicular to a polarization axis of the polarizing plate 30. A sawtoothed part is provided at an end face of the light guide plate 31 where the lamp light enters. The sawtoothed part introduces the light from the lamp 13 after refraction by 45° so as to let the light enter perpendicular to reflecting faces of the reflecting members 50g–50r. In the constitution as above, since the polarization axis of the polarizing plate 30 is inclined by 45° to the frame, right and left view angles are symmetrically secured even when a general TN liquid crystal is used.

The shape and an arrangement of the reflecting members 50g–50r can be changed suitably in accordance with the index of refraction thereof, the index of refraction of the light guide plate 31, etc.

Figure 7:
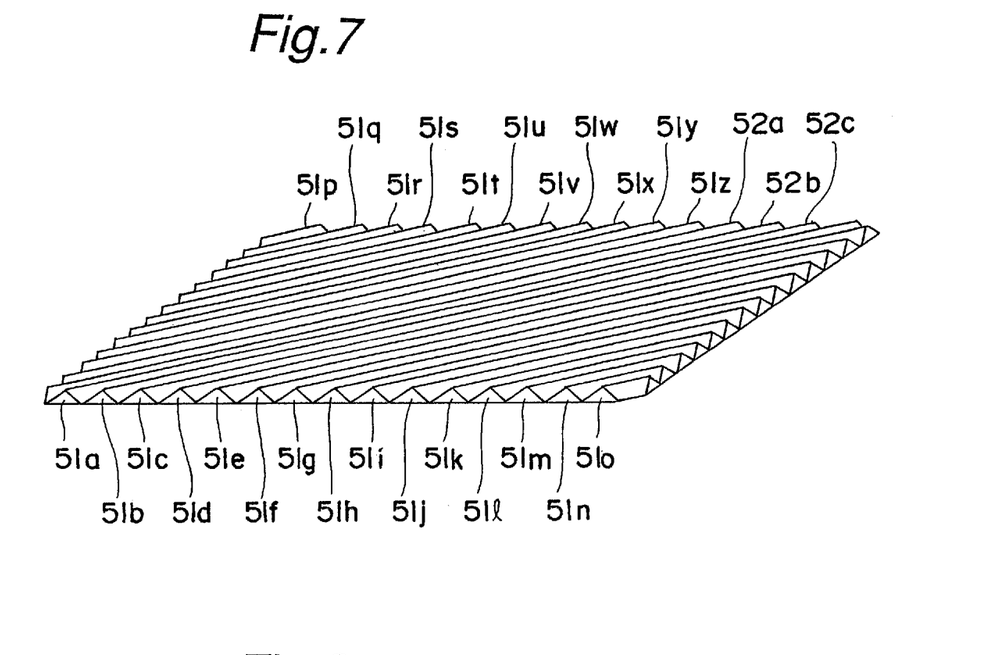
FIG. 7 is a diagram of a modified example of the arrangement of the reflecting member.
Figure 8:
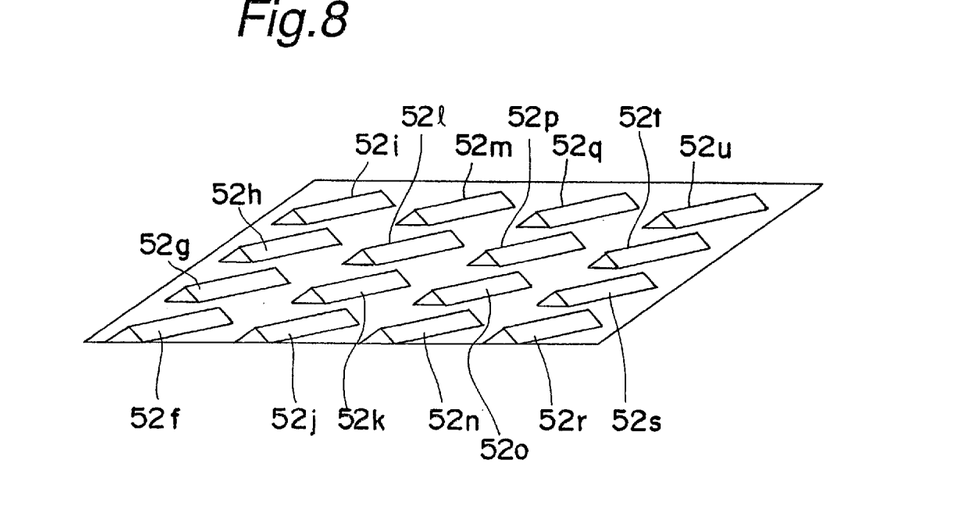
FIG. 8 is a diagram of a modified example of the arrangement of the reflecting member.

FIGS. 7 and 8 represent other arrangements of the reflecting members 50g–50r in the light guide plate 31 different from FIG. 6. In FIG. 7, reflecting members 51a–51z, 52a–52c are set without any gap in the light guide plate 31. When the reflecting members are arranged without any gap as above, the light can be more uniformly reflected to the liquid crystal panel unit.

In FIG. 8, reflecting members 52f–52u are scattered on the light guide plate 31. Since the number of reflecting members disposed in the light guide plate is reduced, the liquid crystal panel module is decreased in cost.

(2) Modified Example

Figure 9:
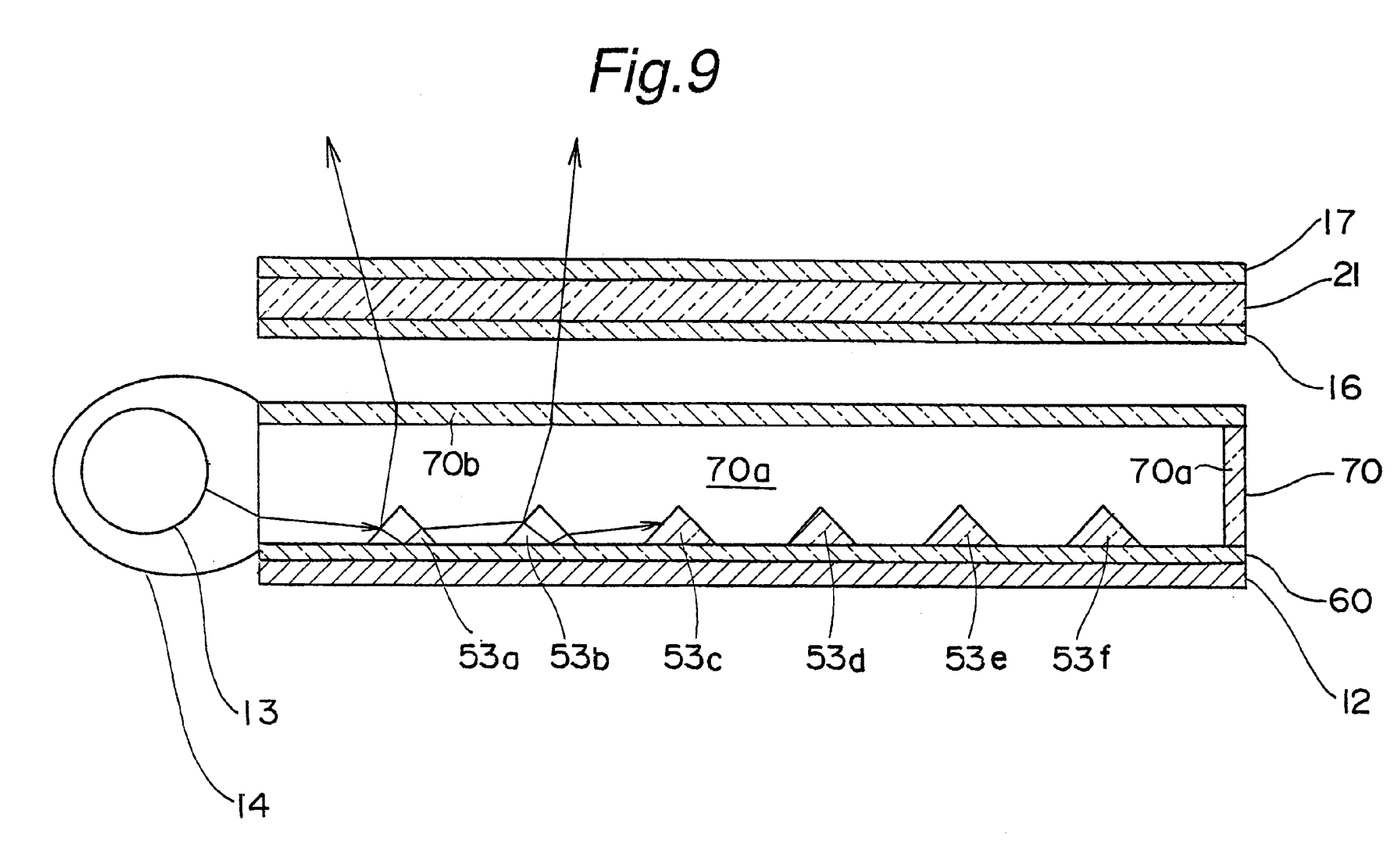
FIG. 9 is a sectional view of the constitution of a modified example of the liquid crystal panel module.

FIG. 9 is a sectional view showing the constitution of a modified example of the liquid crystal panel module 5 of the liquid crystal panel display device 4 of embodiment 1. The same parts as those of the liquid crystal panel module 5 of the embodiment 1 are denoted with the same reference numerals and a duplicate description will be eliminated here.

The liquid crystal panel module in the modified example features a light guide plate 70 which has a space 70a where the light from the lamp 13 directly enters prism faces of reflecting members 53a–53f. The light guide plate 70 has a structure, with that three side faces and one side face into which the light from the lamp 13 is introduced. A face opposite the liquid crystal panel 21 is confined by an acrylic plate 70b, and, moreover a reinforcing member 70c (not shown) is provided at a face in contact with the polarization rotating film 60 which does not restrain the lamp light from entering the prism faces. A material of a higher index of refraction than that in the light guide plate 70 is used for the reflecting members 53a–53f. For instance, if the index of refraction inside the light guide plate is n=1, an acrylic resin of 1.49 index of refraction is used for the reflecting members 53a–53f. The shape and arrangement of the reflecting members 53a–53f are equal to those of the reflecting members 50a–50f and the like.

In the above constitution, the reflecting members 53a–53f can be formed of an inexpensive material and have a relatively small index of refraction. If an acrylic resin is used, the reflecting members 53a–53f can be molded, and therefore the production cost is greatly decreased as compared with in the case of the other materials of Table 1. Besides, since the space is provided in the light guide plate 70, the liquid crystal panel module becomes light-weight.

(3) Embodiment 2

Figure 10:
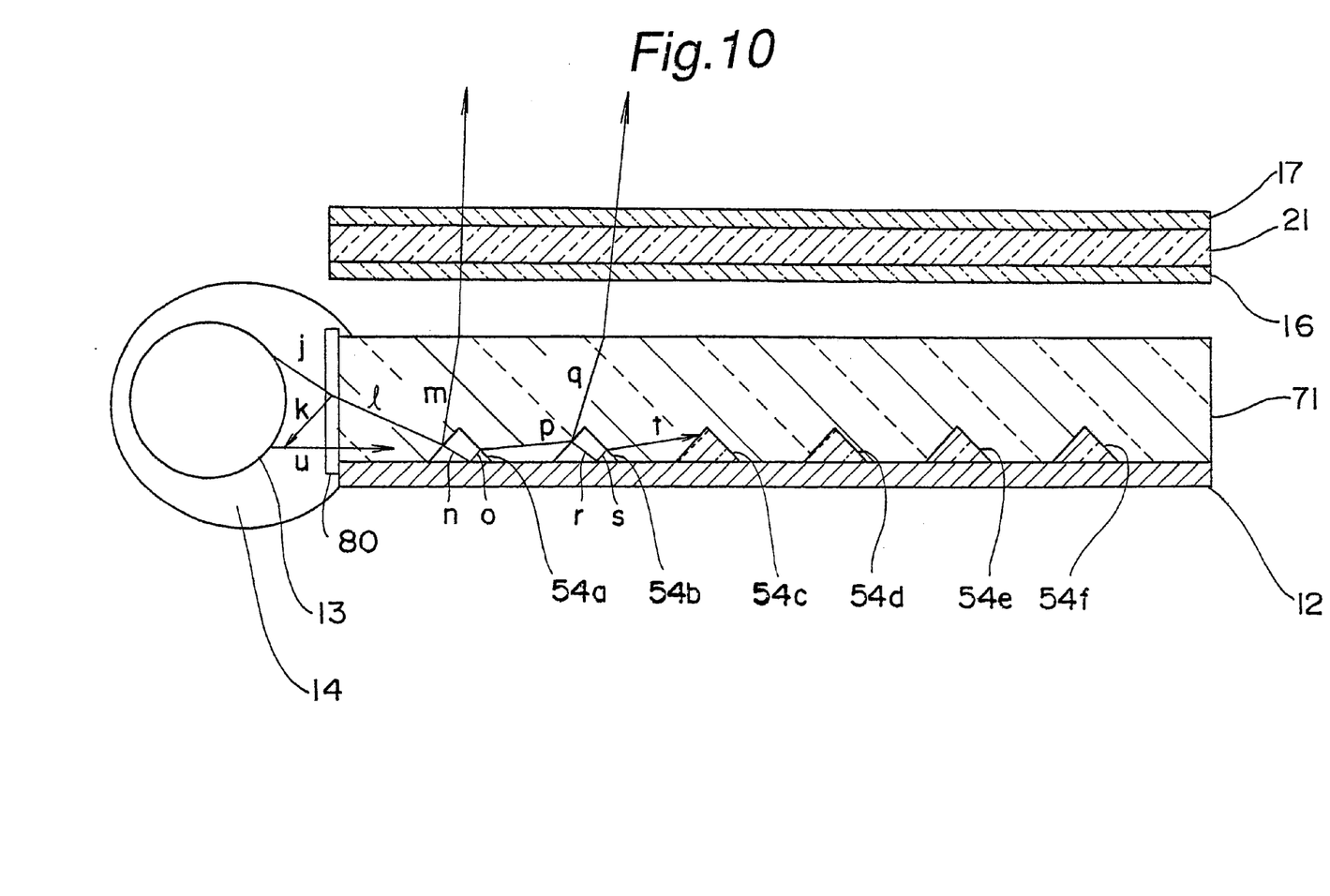
FIG. 10 is a sectional view of the constitution of a liquid crystal panel module according to an embodiment 2 of the present invention.

FIG. 10 indicates the constitution of a liquid crystal panel module according to an embodiment 2 of the present invention, in which the same parts as those of the liquid crystal panel module 5 of the embodiment 1 are designated by the same reference numerals to avoid a duplicate description. The liquid crystal panel module of this embodiment has, similar to the liquid crystal panel module 5 of the embodiment 1, an acrylic or hollow light guide plate 71 and reflecting members 54a–54f of a predetermined material which is specified by the index of refraction in the light guide plate 71. Moreover, a reflecting type polarizing separating film 80 is interposed between an opening of the reflector 14 at the side of the light guide plate 71. The polarizing separating film 80 passes only s polarized light to the plane of incidence of the reflecting member 54 while reflecting light of the other polarization directions. The polarizing separating film 80 is, by way of example, DBEF by Sumitomo 3M Co., Ltd. (registered trade name by Sumitomo 3M).

Among light (of an arrow j) emitted from the lamp 13, the s polarized light perpendicular to a bottom face of the light guide plate 71 penetrates the polarizing separating film 80 (in the direction of an arrow 1) and enters straight into the light guide plate 71. In contrast, the p polarized light in the horizontal direction is reflected at the polarizing separating film 80 (in a direction of an arrow k), irregularly reflected at the lamp 13 and reflector 14 thereby to be changed in polarization direction, and returned to the polarizing separating film 80 (in a direction of an arrow u). Accordingly, the light (of the arrow 1) entering the light guide plate 71 becomes a linearly polarized light formed simply of the s waves perpendicular to the bottom face of the light guide plate 71. Since the reflecting members 54a–54f set in the light guide plate 71 have flat reflecting faces, the polarization direction of light (of arrows m, n, o, p, q, r, s, t, etc.) in the light guide plate 71 never changes. In consequence of this, the linearly polarized light of the s waves alone is brought into the polarizing plate 16, so that the absorption of light at the polarizing plate 16 is almost perfectly eliminated. Illumination efficiency of the TFT liquid crystal panel 21 by the lamp 13 is thus improved greatly.

Although the liquid crystal panel module uses an expensive reflecting type polarizing separating film in comparison with the general polarizing plate, the polarizing separating film 80 is attached only to an end face of the light guide plate 71 from which the light of the lamp 13 enters, unlike the conventional example of FIG. 13 wherein the polarizing separating film 205 is attached to the entire bottom face of the liquid crystal panel. The illumination efficiency of the TFT liquid crystal panel 21 by the lamp 13 is improved with the cost increase of the liquid crystal panel module restricted.

Figure 11A:
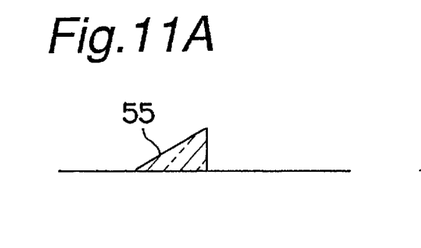
FIGS. 11A and 11B are diagrams of modified examples of the reflecting member.
Figure 11B:
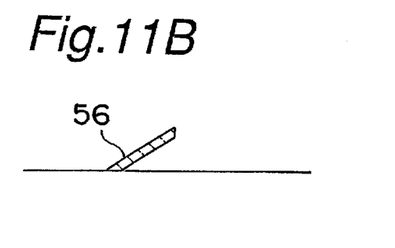

According to the liquid crystal panel module of embodiment 2, different from the embodiment 1, light entering the light guide plate 71 is linearly polarized light composed only of s waves, perpendicular to the bottom face of the light guide plate 71. Therefore, instead equilateral prism reflecting members 54a–54f, a right triangular reflecting member as shown in FIG. 11(*a*) or a reflecting plate 56 having a section as illustrated in FIG. 11(*b*) may be employed.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A liquid crystal panel module comprising:
  a backlight unit including
    a light guide plate having a first index of refraction, a front surface, a back surface including a plurality of grooves and located opposite the front surface, and a side surface transverse to the front and rear surfaces,
    a reflecting sheet at the back surface of said light guide plate,
    a lamp for illuminating the side surface of said light guide plate, and
    a reflector condensing light radiated from said lamp onto the side surface of said light guide plate;
  a liquid crystal panel unit arranged opposite the front surface of said light guide plate of said backlight unit and including a polarizing plate having a polarization axis and located on a rear surface of said liquid crystal panel unit opposite the front surface of said light guide plate; and
  a plurality of equilateral prisms arranged within and filling the grooves in said light guide plate, exposed at the back surface of said light guide plate, and arranged in a direction parallel to the polarization axis of said polarizing plate, each of said plurality of equilateral prisms having a prism angle so that light guided into said light guide plate impinges on a surface of an equilateral prism at the Brewster angle of said equilateral prism, said equilateral prisms having a second index of refraction larger than the first index of refraction of said light guide plate.

2. The liquid crystal panel module according to claim 1 further comprising a polarization rotating plate at the back surface of said facing said light guide plate, between said reflecting sheet and said light guide plate, for rotating polarization direction of incident light.

3. A liquid crystal panel module comprising:
  a backlight unit including
    a light guide plate having a first index of refraction, a front surface, a back surface including a plurality of grooves and located opposite the front surface, and a side surface transverse to the front and back surfaces,
    a reflecting sheet on the back surface of said light guide plate,
    a lamp for illuminating the side surface of said light guide plate,
    a polarizing separating film disposed on the side surface of said light guide plate, between said lamp and said light guide plate, and
    a reflector condensing light radiated from said lamp onto the side surface of said light guide plate through said polarizing separating film;
  a liquid crystal panel unit arranged opposite the front surface of said light guide plate of said backlight unit and including a polarizing plate having a polarization axis and located on a rear surface of said liquid crystal panel unit opposite the front surface of said light guide plate wherein said polarizing separating film has a polarization direction aligned with the polarization axis of said polarizing plate; and
  a plurality of reflecting members arranged within and filling the grooves in said light guide plate and exposed at the back surface of said light guide plate, reflecting light guided into said light guide plate directly into said liquid crystal panel unit, wherein said plurality of reflecting members have a second index of refraction larger than that of the first index of refraction of said light guide plate.

4. The liquid crystal panel module according to claim 3 wherein said plurality of reflecting members comprise a plurality of equilateral prisms, each of said plurality of equilateral prisms having a prism angle so that light guided into said light guide plate impinges on a surface of an equilateral prism at the Brewster angle of said equilateral prism.

5. The liquid crystal panel module according to claim 3 wherein said plurality of reflecting members comprises a plurality of right angle prisms.

6. A liquid crystal panel module comprising:
  a backlight unit including
    a hollow light guide having a front wall and a side wall transverse to the front wall, together partially defining a hollow volume, a reflecting sheet at a back wall of said hollow light guide, a lamp for illuminating said hollow light guide at an open side of said hollow light guide, opposite the side wall, a polarization rotating plate on said reflecting sheet facing said front wall, forming the back wall and partially defining the hollow volume, for rotating polarization direction of light incident at an angle on said polarization rotating plate, and a reflector condensing light radiated from said lamp into said hollow light guide;

a liquid crystal panel unit arranged opposite the front wall of said hollow light guide of said backlight unit and including a polarizing plate having a polarization axis located on a rear surface of said liquid crystal panel unit opposite the front wall of said hollow light guide; and a plurality of equilateral prisms arranged within said hollow light guide at said polarization rotating plate, in a direction parallel to the polarization axis of said polarizing plate, each of said plurality of equilateral prisms having a prism angle so that light guided into said hollow light guide impinges on a surface of an equilateral prism at the Brewster angle of said equilateral prism wherein said equilateral prisms have an index of refraction larger than in the hollow volume of said hollow light guide.

7. The liquid crystal panel module according to claim 6 further comprising a polarization rotating plate at the back wall of said hollow light guide, between said reflecting sheet and said hollow light guide, for rotating polarization direction of incident light.

* * * * *